United States Patent [19]
Lackey

[11] Patent Number: 5,626,147
[45] Date of Patent: May 6, 1997

[54] TYMPANIC THERMOMETER

[75] Inventor: Robert P. Lackey, Carlsbad, Calif.

[73] Assignee: Thermoscan, Inc., San Diego, Calif.

[21] Appl. No.: 156,448

[22] Filed: Nov. 23, 1993

[51] Int. Cl.$^6$ ............................................. A61B 5/00
[52] U.S. Cl. ................................... 128/736; 128/664
[58] Field of Search ........................... 128/736, 669; 374/2, 128, 133

[56] References Cited

U.S. PATENT DOCUMENTS

| | | | |
|---|---|---|---|
| 3,274,994 | 9/1966 | Sturm | 128/736 |
| 4,797,840 | 1/1989 | Fraden | 128/736 X |
| 4,895,164 | 1/1990 | Wood | 128/736 |
| 4,993,419 | 2/1991 | Pompei et al. | 128/664 |
| 5,012,813 | 5/1991 | Pompei et al. | 128/736 X |
| 5,150,969 | 9/1992 | Goldberg et al. | 128/664 X |
| 5,178,464 | 1/1993 | Fraden . | |
| 5,232,284 | 8/1993 | Egawa et al. | 128/736 X |
| 5,246,292 | 9/1993 | Gal et al. | 128/664 X |

*Primary Examiner*—Sam Rimell
*Attorney, Agent, or Firm*—Hopgood, Calimafde, Kalil & Judlowe

[57] ABSTRACT

An IR thermometer design using multiple sensor outputs for correcting errors induced by variable probe placement in a patient's ear canal. One embodiment of the system uses two or more sensors to create varying fields of view of the tympanic membrane IR emissions. These discrete IR readings are then reconciled by on-board signal processing to provide an accurate, repeatable and relatively position independent temperature reading.

28 Claims, 5 Drawing Sheets

TYMPANIC THERMOMETER

The present invention relates to temperature measurement devices used in diagnostic and therapeutic treatment. More particularly, the present invention relates to the use of specialized sensor geometries to create multiple viewing angles that enhance the accuracy and repeatability of temperature readings taken from the IR emissions radiating from the tympanic membrane of the ear.

BACKGROUND TO THE INVENTION

Recent progress has been made in developing systems for tympanic membrane temperature measurement. By way of background, mammalian temperature has long been of keen interest to doctors and others involved in diagnosis and treatment of patient pathologies. On the other hand, accurate temperature measurement, accomplished in a quick, unintrusive and inexpensive manner has remained a considerable task. Measuring the temperature of the tympanic membrane of the ear has been found to provide a highly accurate body temperature reading. By collecting the infrared emissions from the tympanic membrane, an accurate temperature reading can be ascertained in an unintrusive procedure.

As stated above, many systems have been proposed for temperature measurement based on tympanic IR emissions. Exemplary patents in this field include U.S. Pat. No. 4,895,164 to Wood, 4,797,840 to Jacob Fraden, Ph.D. and U.S. Pat. No. 5,199,436 to Pompei, et al.; the contents of these patents are incorporated herein by reference. These systems vary in both accuracy and complexity, but in large have been found to be very useful for their intended purposes, and are now enjoying commercial popularity. Notwithstanding these past successes, a common and significant handicap resides with even the most expensive of these systems. This handicap relates to the accuracy and repeatability of the readings obtained.

It has been found that the typical IR thermometer will give a reading that varies in significant amounts depending on the angle and depth of placement of the tip vis-a-vis the ear canal. This variation is caused by changes in the sensor position relative to the wave guide, the ear canal and tympanic membrane. More particularly, the geometric relationship between the sensor and the tympanic membrane will influence the ultimate reading by the sensor in operation. As this geometry changes, the sensor will encounter reading fluctuations independent of actual membrane temperature.

These problems can be better visualized by reference to the prior art probe design and its placement in a typical ear canal—see, e.g., FIGS. 1 and 2. In FIG. 1, a simplified diagram depicts the general elements of an IR type thermometer and its physical relationship with a human ear. In this use, the thermometer develops a field of view of the ear canal and tympanic membrane of the ear as depicted in FIG. 2. As can be appreciated, the field of view of the thermometer will depend on the position in terms of depth and angle as applied by the user of the device.

In this regard, an angular displacement from perpendicular will afford greater influence to the ear canal wall, while a deeper placement of the probe into the ear canal will lessen the influence of the ear canal vis-a-vis the tympanic membrane. Accordingly, different readings will result from the same patient solely as a function of thermometer placement in the ear. Of course, ear canal dimensions will also differ amongst individuals, adding an additional variance. The impact of these variances on typical temperature readings is illustrated in Table I below—which delineates temperature reading as a function of probe position.

TABLE I

| Angle | Depth | Temperature |
|---|---|---|
| 0 | 0 | 96° |
| 0 | 1 mm | 97° |
| 20° | 0 | 95° |

As noted above, this phenomenon is intimately related to the field of view of the sensor system. This field of view is influenced by several design aspects, chief of these being the relative position of the sensor to the wave guide. Other things being equal, a large diameter wave guide positioned close to a small sensor will exhibit a relatively wide field of view, while a narrow wave guide positioned at a relatively greater distance from a larger sensor (in terms of radiation impingement surface area) exhibits a narrow field of view.

The impact of the field of view for the sensor system can be expressed in the following way. Sensors with a narrow field of view afford accurate readings relatively independent of distance from the target (depth of probe in the ear)—but fluctuate to a greater degree in temperature reading (and accuracy) when angle displacements are introduced in sensor placement vis-a-vis the ear. Alternatively, a sensor with a wide field of view provides reciprocal properties. The wide field of view sensor gives a reading relatively insensitive to angle of probe placement—but is more sensitive to probe depth. These principles may be better visualized by inspection of the graphs in FIGS. 3 and 4.

Although the above-noted dichotomy between narrow and wide views provides a useful illustrative tool, it should be noted that two sensors having the same viewing width may, however, exhibit different views, as the angle of view may be altered. The implication of these properties is that the various geometric sensor arrangements found in prior art IR thermometers are prone to position dependent reading variations.

OBJECTS AND SUMMARY OF THE PRESENT INVENTION

It is, therefore, an object of the present invention to provide an IR thermometer having a sensor system that compensates for probe placement and provides a repeatably accurate temperature reading.

It is another object of the present invention to provide an IR thermometer having a sensor system that combines wide and narrow field of view readings thereby compensating for differing angle and depth probe placement in temperature measurement.

It is a further object of the present invention to provide a sensor system and controlling logic that incorporates multiple sensors having varying fields of view to produce multiple readings for processing into a depth and angle position independent accurate measurement of body temperature.

It is yet another object of the present invention to provide a sensor system with controlling logic wherein sensor data is correlated to compensate for angle and depth position signal incongruence by system logic to provide a singular temperature measurement.

The above and other objects of the present invention are realized in a novel infrared thermometer employing a partitioned sensor system for the development of at least two signals relating to differing fields of view of the tympanic membrane of the ear. The sensor system includes two or more separate sensors or IR receivers positioned to collect different proportions of IR radiation from the tympanic membrane. The multiple sensors have a varying field of vision, e.g., ranging from wide to narrow, with the level of variance specifically known and pre-selected. The sensors are connected to a pre-programmed logic device. The information is then correlated in a manner that takes into account the known difference in the field of view for each sensor to arrive at a meaningful measurement of IR-source temperature.

In accordance with the varying aspects of the present invention, the signal processor analyzes differences between the readings from each of the separate sensors. These differences are then used to select correction values from a memory resident storage (e.g., look-up table) or via separate determination using an appropriate processing algorithm. The corrective values are then applied in generating an accurate and repeatable body temperature reading for use in diagnosis and therapeutic treatment of the patient.

The foregoing features of the present invention may be more fully appreciated in the specific illustrative embodiment as described hereinbelow in conjunction with the following drawings of which:

DESCRIPTION OF THE PRESENT INVENTION

First, briefly in overview, the present invention is directed to a sensor system that compensates for different ear canal placement geometries by creating an IR signal collected via both wide and narrow fields of view. By using IR information that is responsive to a wide field of view in conjunction with information from a narrow field of view, the errors in temperature reading occasioned by the vagaries in probe positioning in the ear can be compensated by appropriately programmed signal adjustment. Specifically, the signal processor integrated with the sensor, weighs the input from both sources and using a look-up table, applies corrective values to give an accurate and repeatable temperature measurement.

Figure 1:
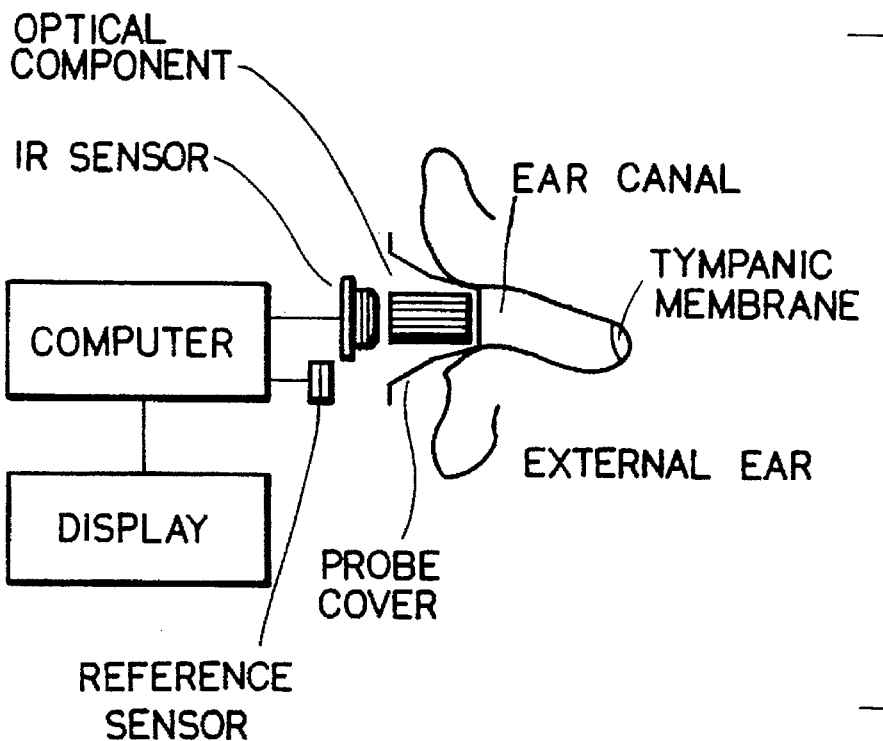
FIGS. 1 and 2 depict the problems associated with the prior art.
Figure 2:
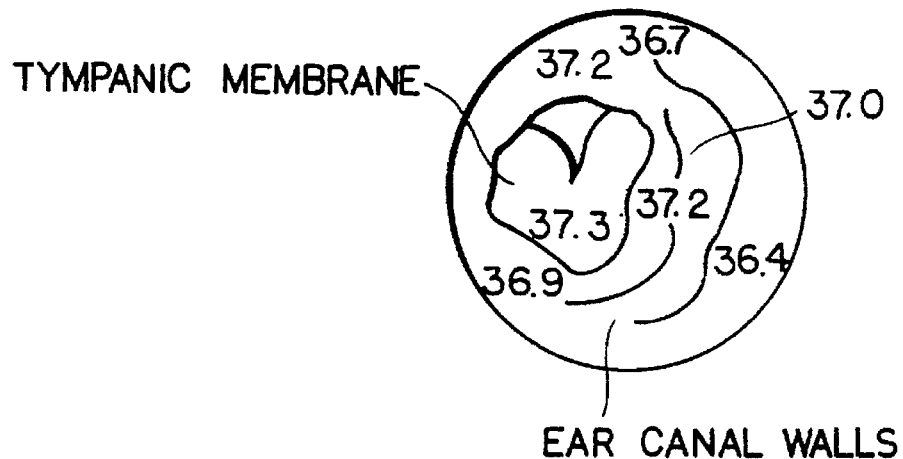
Figure 3:
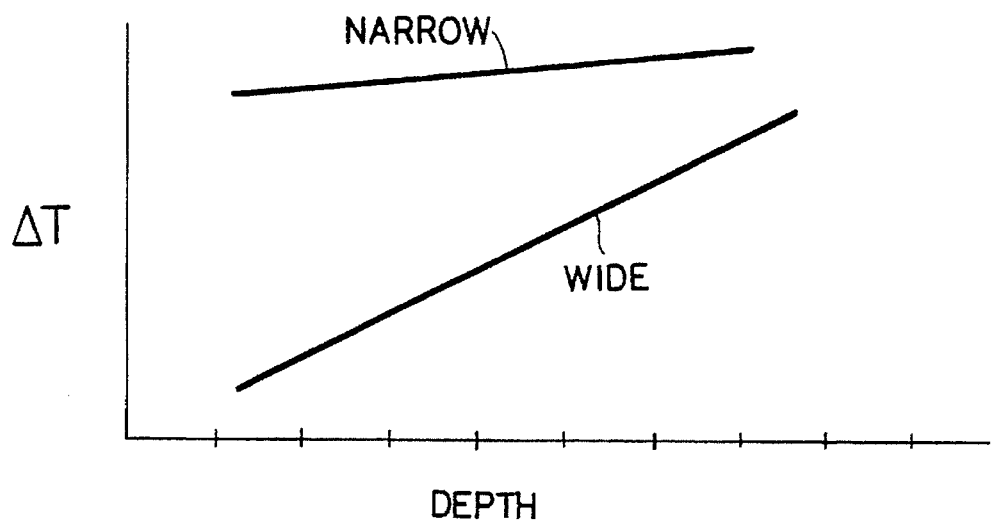
FIGS. 3 and 4 depict graphically the impact on temperature readings for wide and narrow field of view designs.
Figure 4:
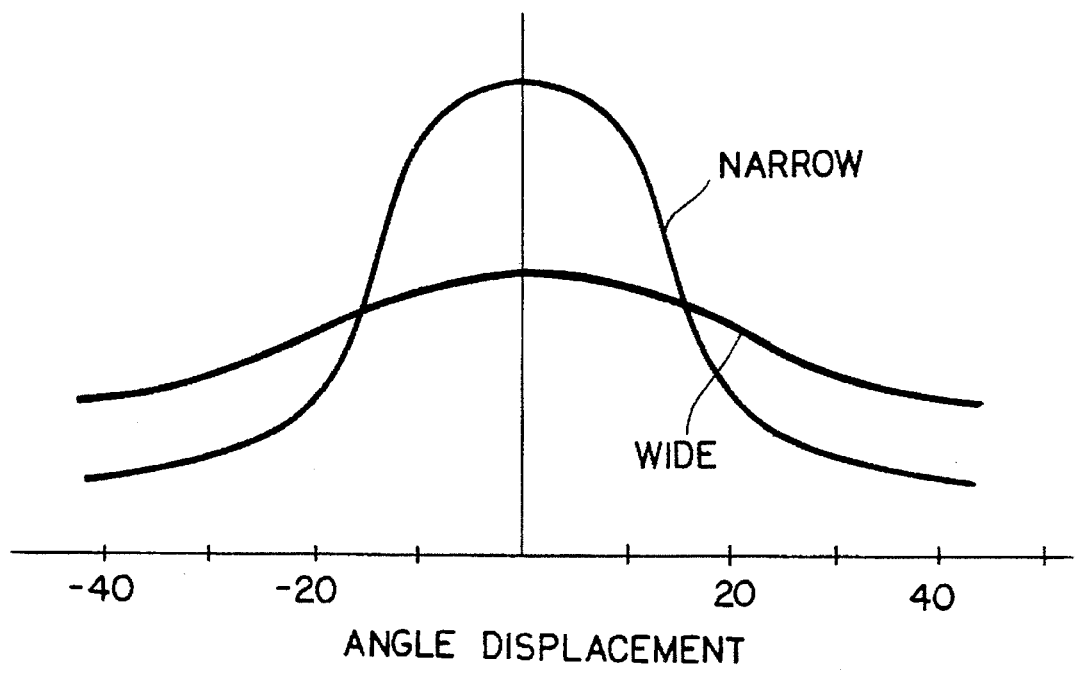
Figure 5:
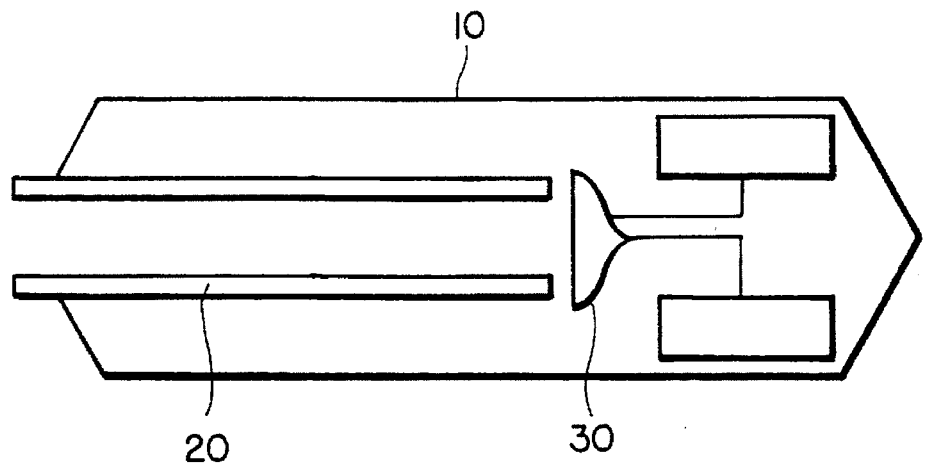
FIG. 5 presents a simplified structure of an IR thermometer made in accordance with the present invention.

With the foregoing overview in mind, attention is directed to FIG. 5 which provides a simplified diagram of the salient elements in an IR thermometer. In this illustrative diagram, the thermometer device provides a housing 10 for containment of the operative elements of the device. Specifically, the housing has an IR receiving opening 15 at a terminus end thereof, positioned to feed incoming radiation to a wave guide 20. There are a variety of possible wave guides available for use that offer different performance characteristics in terms of distortion and price, ranging from smooth gold-plated tubes to fiber optic bundles. In functional terms, the wave guide is designed to collect and pass incoming radiation undisturbed, to IR sensor 30. Again, there are several choices in sensor systems, including thermopile types and pyroelectric elements. For purposes of this presentation, the sensor of choice is the pyroelectric sensor, which requires "matched pairs" to cancel out signal contributions intrinsic with the pyroelectric elements.

Continuing with FIG. 5, the sensor 30 is connected to processor 40 for converting the IR data into a high quality temperature reading as will be described in more detail below. In the context of the present invention, the sensor design has been modified to create signals for both wide and narrow fields of view. This is accomplished by creating two or more sensors, each reporting separately to the processor information on radiation.

Figure 6:
FIG. 6 provides a bimodal sensor geometry capable of producing both wide and narrow fields of view within the same wave guide.

The sensor geometry capable of this is depicted in FIG. 6. More specifically, the sensor 30 of FIG. 5 is, in fact, two separate sensors, 32 and 34, each connected to the processor 40. The first sensor 32 is relatively smaller and concentric to the center line of the wave guide 20, thus providing a narrow field of view. The outer sensor 34, on the other hand, is somewhat larger and positioned outside the perimeter of the wave guide—thereby providing a relatively wider field of view.

Figure 7:
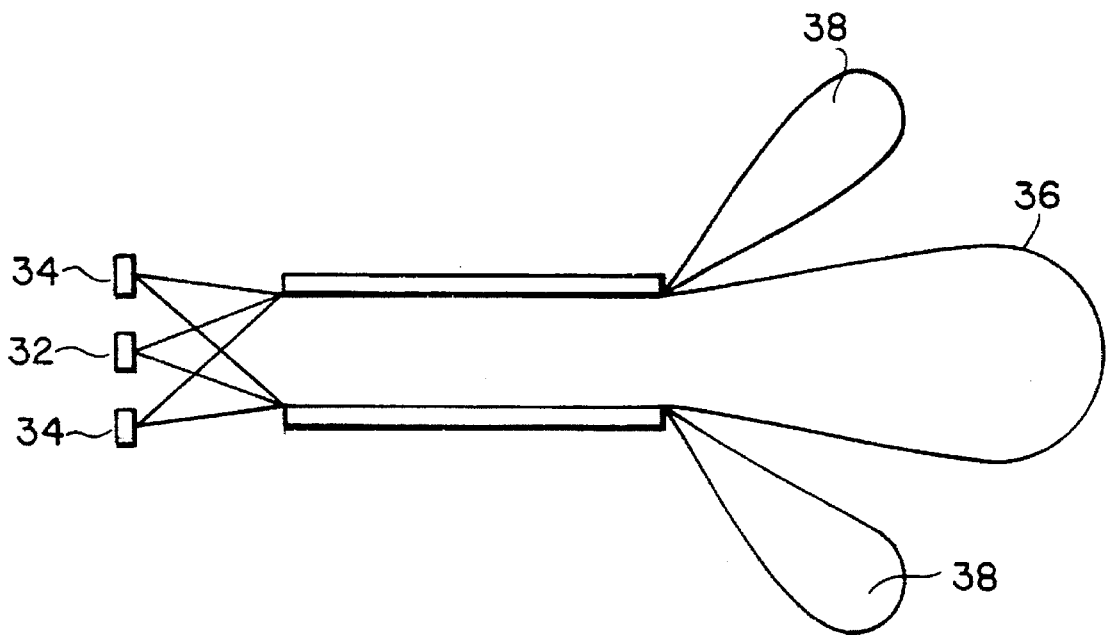
FIG. 7 illustrates the output for the bimodal sensor design of FIG. 6.

The above-noted outputs are illustrated in detail in FIG. 7, a cross-sectional view of the wave guide and sensors. Specifically, sensor 32 has a field of view depicted by region 36, and sensor 34 has a field of view depicted by region 38. These respective regions are delineated by the relative position of the sensors and the wave guide 20. As can be readily seen, wide and narrow IR signal contributions can be developed by modifying the geometry and placement of these sensors in the system.

Figure 8A:
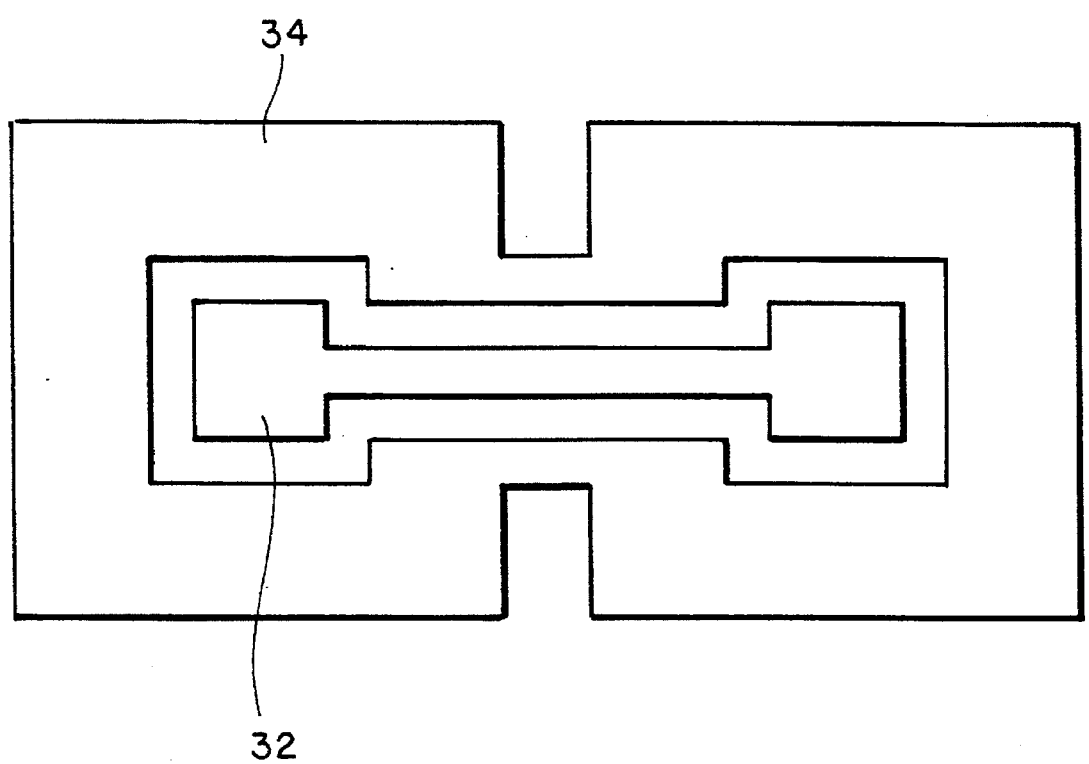
FIG. 8 depicts a bimodal sensor design for use with a specific sensor system.
Figure 8B:
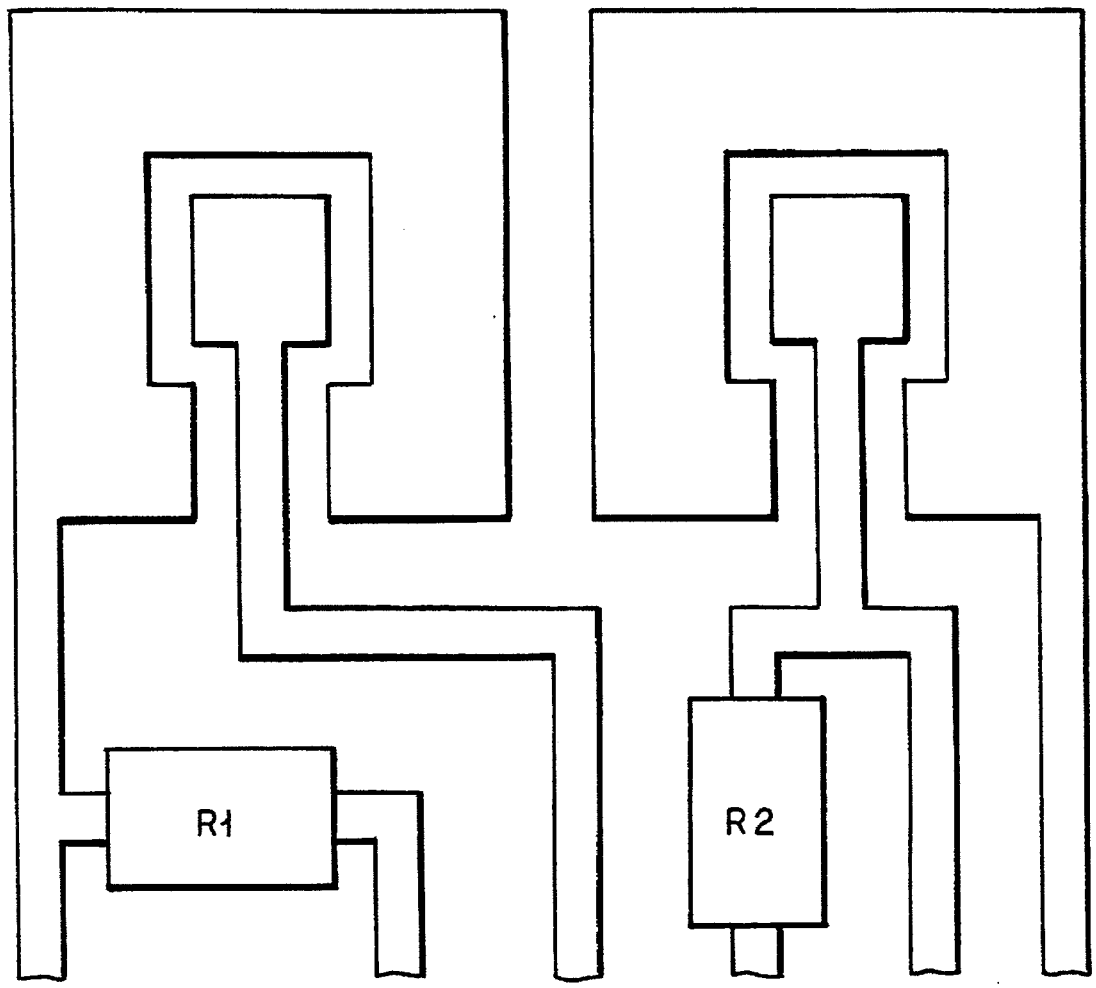

Turning now to FIG. 8, the above-noted sensor geometry is depicted for a system of pyroelectric sensors—specifically, FIG. 8A provides a frontal view of the corresponding sensor design with sensors 32 and 34; FIG. 8B likewise provides the same design as viewed from the back, wherein the connectors to the processor are located.

Figure 9:
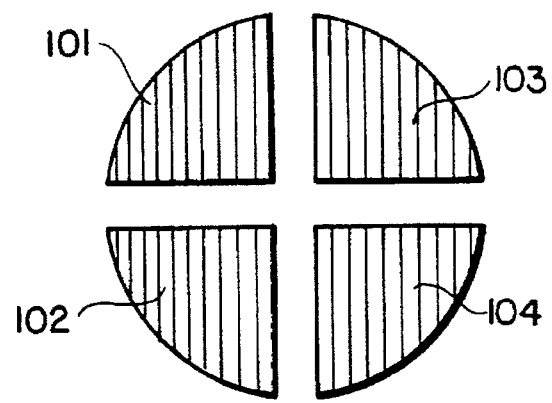
FIG. 9 provides an alternate sensor geometry.

The foregoing discussion has focused on multiple fields of views as generated by independent sensors having differing view "widths" (i.e., narrow or wide). The principles of the invention are also applicable to independent sensors having differing fields of view wherein the difference is angular, not width. This difference may be generated by the sensor design depicted in FIG. 9, which depicts a sensor assembly with four separate IR receiving areas, 101–104.

Moreover, different fields of view may be generated by the same sensor at different times. This can be accomplished by shutter mechanisms, rotating lens or other means of time modulating the radiation path between the sensor and the tympanic membrane.

Corresponding to each geometry, the sensor is connected to the processor for quantifying incoming IR data and generating corrective values to properly align the temperature measurement. In the above examples, the multiple sensors reside in the same plane relative to the wave guide. An alternative method for creating differing fields of view involves changing the planar relationship between the wave guide and one or more of the sensors. However the arrangement is implemented, the system logic is pre-programmed to adjust readings corresponding to the geometry selected.

In this regard, the determination of corrective values for processing of the IR data from two or more sensors can be accomplished by several techniques. For example, assuming the two sensor system of FIG. 8A, a simplified look-up table can be generated and stored on-board system memory. In this example, the temperature from IR sensor 32 is subtracted from sensor 34 to give a Delta sensor value. This value is then used to pull out from the table a corrective value, Q, to add to the temperature reading from sensor 34 resulting in the final displayed temperature reading, T. This relationship can be expressed as an algorithm or in table form—as in Table II below:

TABLE II

| T(34) - T(32) | Q |
|---|---|
| >2.5 | 0 |
| 2 | 0.2 |
| 1 | 0.5 |
| 0 | 1.0 |
| −1 | 2.5 |
| −2 | 5.0 |

The above-described arrangement is merely illustrative of the principles of the present invention. For example, the above system is described in the context of measuring incoming IR radiation. The approach delineated above is also applicable to active sensor designs wherein the sensor broadcasts an IR signal toward the tympanic membrane corresponding, in part, to the tympanic temperature. (See, Fraden, U.S. Pat. No. 4,797,840). Similarly, this arrangement may be used for a null net IR thermometer, wherein sensor and membrane temperature are equilibrated. Numerous modifications and adaptations thereof will be readily apparent to those skilled in this art without departing from the spirit and scope of the present invention.

What is claimed is:

1. In an apparatus for measuring body temperature by correlating IR emissions from a tympanic membrane within an ear canal of said body, said apparatus including a housing to be handheld, a probe tip for insertion into said ear canal to guide IR emissions within said housing wherein said apparatus further comprises:

wave guide means in IR communication with said probe tip and connected to a sensor means wherein said sensor means further comprises a first IR communicating sensor and a second IR communicating sensor each having a discrete field of view of said tympanic membrane relative to said wave guide means to create at least two IR dependant signals that differ from each other in fields of view, for IR communication;

said wave guide means has a single effective diameter that is greater than said first sensor but less than said second sensor; and signal processing means for ascertaining a signal from each of said sensors and based thereon, providing a corrected temperature reading compensating for sensor placement geometry in said ear canal.

2. The apparatus of claim 1 wherein said first sensor has a perimeter that is greater than a perimeter of said second sensor.

3. The apparatus of claim 1 wherein said first sensor is of the pyroelectric type.

4. The apparatus of claim 1 wherein said first sensor is of the thermopile type.

5. The apparatus of claim 1 wherein said signal processing means includes data storage means for storing a look-up table of temperature correction factors.

6. The apparatus of claim 5 wherein said temperature correction factors are calculated by solution of a temperature correction algorithm.

7. The apparatus of claim 5 wherein said signal processing means accesses said correction factor from said look-up table based on the relative IR readings taken from said first sensor and said second sensor.

8. In combination in a system for measuring tympanic membrane temperature by registering IR emissions, said system comprising:

a housing with an IR emission port;

a wave guide means within said housing having a first and a second end, said first end coupled to said emission port;

a sensor means in IR communication with said wave guide means for generating at least two IR dependent signals that differ from each other in fields of view, said sensor means includes plural sensors arranged in said housing to afford distinct fields of view of said tympanic membrane;

a data processor means for receiving said IR dependent signal from said sensor means and determining a corrected temperature reading based thereon; and said data processor means includes memory for storing a matrix of pre-stored correction values accessed by a difference in outputs between two or more of said plural sensors.

9. The system of claim 8 wherein said plural sensors are arranged concentrically about an axis defined by a centerline for said wave guide.

10. The system of claim 8 wherein two discrete fields of view are created for said sensor means.

11. In combination in a method for enhancing the accuracy and repeatability of a temperature reading based on collected IR emissions emanating from a tympanic membrane, comprising the steps of:

a. placing a first emission port of a wave guide into a patient's ear canal;

b. placing a plurality of IR sensitive sensors at discrete positions proximate to and in IR communication with a second emission port of said wave guide;

c. collecting IR emission dependent signals from said plurality of IR sensitive sensors and developing a plurality of discrete temperature readings from each of said plural sensors, and d. determining a corrected temperature of said tympanic membrane by correlating said plurality of said temperature readings to correct position errors caused by different depth and position placement of said receiving end of said wave guide, said determining accomplished by a logic device that accesses stored correction values based on reading differences between said plural sensors.

12. The method of claim 11 wherein said IR sensitive sensors are made of pyroelectric material.

13. The method of claim 11 wherein said IR sensitive sensors are co-planar.

14. In an apparatus for measuring remote external target temperature by correlating IR emissions from said external target, said apparatus including a housing to be handheld and a probe tip to guide IR emissions within said housing wherein said apparatus further comprises:

wave guide means in IR communication with said probe tip and connected to a sensor means wherein said sensor means further comprises a first IR communicating sensor and a second IR communicating sensor each having a discrete field of view of said external target relative to said wave quids means to create at least two IR dependant signals that differ from each other in fields of view, for IR communication; and signal processing means for ascertaining a signal from each of said sensors and based thereon, providing a corrected temperature reading compensating for sensor placement geometry.

15. The apparatus of claim 14 wherein said first sensor has a perimeter that is greater than a perimeter of said second sensor.

16. The apparatus of claim 14 wherein said first sensor is of the pyroelectric type.

17. The apparatus of claim 14 wherein said first sensor is of the thermopile type.

18. The apparatus of claim 14 wherein said signal processing means includes data storage means for storing a look-up table of temperature correction factors.

19. The apparatus of claim 18 wherein said temperature correction factors are calculated by solution of a temperature correction algorithm.

20. The apparatus or claim 18 wherein said signal processing means accesses said correction factor from said look-up table based on the relative IR readings taken from said first sensor and said second sensor.

21. In combination in a system for measuring tympanic membrane temperature by receiving IR emissions, said system comprising:

a housing with an IR emission port;

a wave guide means within said housing having a first and a second end, said first end coupled to said emission port;

a sensor means in IR communication with said wave guide means for generating at least two signals, each of which corresponds to said IR emissions, that differ from each other in fields of view; wherein said sensor means is arranged in said housing to afford at least two distinct fields of view through said IR emission port and a data processor circuit for receiving said IR dependent signal from said sensor means and determining a corrected temperature reading based thereon.

22. The system of claim 21 wherein said sensor means includes plural sensors arranged in said housing to afford distinct fields of view of said tympanic membrane.

23. The system of claim 22 wherein said plural sensors are arranged concentrically about an axis defined by a centerline for said wave guide.

24. The system of claim 21 wherein said wave guide means includes means for creating two distinct radiation paths to said sensor means.

25. The system of claim 21 wherein two discrete fields of view are created for said sensor means.

26. In combination in a method for enhancing the accuracy and repeatability of a temperature reading based on collected IR emissions emanating from a tympanic membrane, comprising the steps of:

a. placing a first emission port of a wave guide into a patient's ear canal;

b. placing a plurality of IR sensitive sensors at discrete positions proximate to and in IR communication with a second emission port of said wave guide;

c. collecting IR emission dependent signals from said plurality of IR sensitive sensors and developing a plurality of discrete temperature dependent readings from each of said plural sensors, and d. determining a corrected temperature of said tympanic membrane by correlating said plurality of said temperature dependent readings to correct position errors caused by different depth and position placement of said receiving end of said wave guide.

27. The method of claim 26 wherein said IR sensitive sensors are made or pyroelectric material.

28. The method of claim 26 wherein said IR sensitive sensors are co-planar.

* * * * *